United States Patent
Roman

[11] 3,942,866
[45] Mar. 9, 1976

[54] FIBER-OPTICAL STRUCTURE OF HIGH APPARENT POWER OF RESOLUTION

[75] Inventor: Paul Roman, Paris, France

[73] Assignee: Thomson-CSF Visualisation et Traitement des Informations (T-VT), Paris, France

[22] Filed: Jan. 30, 1974

[21] Appl. No.: 437,884

[30] Foreign Application Priority Data
Feb. 2, 1973 France .................. 73.03716

[52] U.S. Cl. .................. 350/96 B; 250/227
[51] Int. Cl.² .................. G02B 5/16
[58] Field of Search .................. 350/96 B; 250/227

[56] References Cited
UNITED STATES PATENTS

| | | | |
|---|---|---|---|
| 3,024,079 | 3/1962 | Salvatori et al. | 350/96 B X |
| 3,175,481 | 3/1965 | Lahr | 350/96 B X |
| 3,278,754 | 10/1966 | Wallace | 350/96 B X |
| 3,430,057 | 2/1969 | Genahr | 350/96 B X |
| 3,461,304 | 8/1969 | Genahr et al. | 350/96 B X |
| 3,466,928 | 9/1969 | Kind | 350/96 B X |
| 3,504,984 | 4/1970 | Bush | 350/96 B |
| 3,560,084 | 2/1971 | Limberger | 350/96 B X |
| 3,666,949 | 5/1972 | DeFalco et al. | 350/96 B X |
| 3,711,723 | 1/1973 | McMurtry | 350/96 B X |

*Primary Examiner*—David H. Rubin
*Attorney, Agent, or Firm*—Karl F. Ross; Herbert Dubno

[57] ABSTRACT

A light-conducting fiber, or a bundle of such fibers, is provided with a light-absorbing shield extending beyond an end face of the fiber or bundle proximal to a light-reflecting object. The shield forms a light-guiding channel, of a length substantially exceeding its width, which limits the effective aperture angle of the fiber or bundle to considerably less than its inherent value on the order of 60°.

3 Claims, 8 Drawing Figures

FIBER-OPTICAL STRUCTURE OF HIGH APPARENT POWER OF RESOLUTION

The present invention relates to a fiber-optical structure of high apparent resolving power comprising a single light-conductiong fiber or a cluster of such fibers.

It should be noted that the concept of apparent resolving power differs from that of the inherent resolving power of a fiber which is fixed and depends on the refractive indices of the glasses used in its manufacture. Generally, an optical fiber has a core formed from a light-conducting material having a high refractive index which is sheathed in a material having a refractive index lower than that of the core material. This sheathing is intended to prevent losses of the luminous energy being propagated in the fiber. These two indices enable an angle of aperture $a$ (angle of view) to be defined for the fiber, this being the angle over which the luminous flux enters or leaves the fiber.

If N1 is the so-called index of core refraction and N2 is the index of sheath refraction, a simple formula gives the sine of this inherent aperture angle as sin $$a = \sqrt{N1^2 - N2^2}.$$

The angle of aperture of fibers in present-day use is of the order of 60° and is symmetrical about the central axis of the fiber.

There are many uses for optical fibers. In particular they may be used in optical reading equipment to illuminate an object bearing characters or signs and to read these characters or signs. In such an application the angle of aperture or directional lobe of the fiber becomes a matter of some importance since it is on this angle that what is termed the resolving power of the fiber depends, i.e. its ability to separate two elementary signs placed side by side. Clearly, the wider the lobe, the lower is the resolving power of the fiber. The apparent resolving power will tend to fall off with increasing distance of the object to be read and/or illuminated from the entry face or working end of the fiber. Conversely, if the object were as close as possible to the working end of the fiber, this would tend to increase the apparent resolving power. However, choosing a position very close to the working end of the fiber does not represent a satisfactory solution to the problem of resolving power because such positioning is difficult to achieve in practice.

My invention aims at overcoming these drawbacks and providing means for increasing the apparent resolving power of optical fibers while allowing the object to to remain and/or read is still positioned a certain distance away from the the working end of the fiber or fibers.

It should be noted that everything said above about a single fiber also holds good for a cluster or bundle of indentical fibers, the use of such a bundle in lieu of a single fiber the being primarily of interest in practice.

I provide a light-conducting fiber or fiber bundle with a light-absorbing shield extending beyond the working end of the fiber or fibers, i.e. the face proximal to an object from or to which light is to be transmitted, toward that object and forming a light-guiding channel for limiting the effective aperture angle of the fiber-optical structure, thereby increasing its apparent power of resolution.

The above and other features of the invention will be described hereinafter in greater detail with reference to the accompanying drawing in which.

Figure 1:
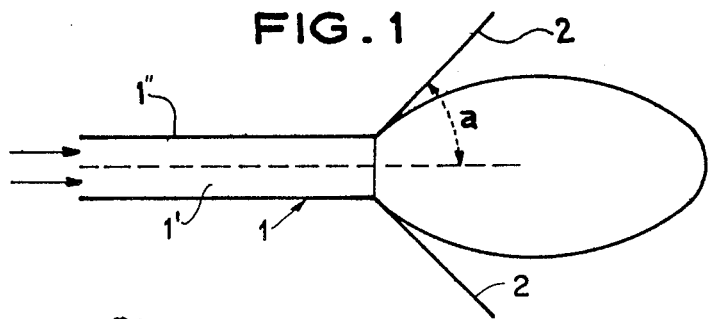
FIG. 1 is a schematic view serving to explain the principles underlying my present invention.

In FIG. 1 I have shown at $a$ the relatively large inherent angle of aperture or directional lobe of a light-conducting optical fiber 1 having a core 1' and a sheath 1'', the limiting rays of the field, of view being designated 2. This large angle results in a low apparent resolving power which is not always compatible with optimum performance.

Besides the fact that the apparent power of resolution is inversely proportional to the angle of the lobe, i.e. that a wide angle corresponds to a low power of resolution, it is also necessary in this context to take into account the amount of energy involved which varies with the distance between the end face of the fiber and the object and also with the part of the object being considered. If, for example, the object has narrow areas of high reflectivity or luminosity and intervening areas of much lower reflectivity or luminasity, the energy involved will vary depending on whether there is a large or small amount of contrast between two adjacent areas with different characteristics and also depending on the possible number of areas with the same or different characteristics which the directional lobe covers, this number being directly related to the resolving power of the directional lobe.

The result is that positioning the object to be dealt with as close as possible to the end of the fiber, which is what is done in current practice, prevents any exploitation of the relatively high level of luminous energy coming from the luminous areas situated within the directional lobe, on account of the fact that the fiber cannot distinguish properly between these luminous areas and the dark area separating them.

To overcome this drawback I propose, in accordance with the invention, to increase the apparent resolving power of the fiber while maintaining the object at a substantial distance from its working end.

Figure 2:
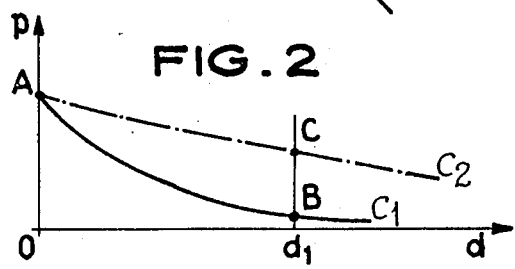
FIG. 2 is a graph showing the change in the apparent resolving power of a fiber as a function of the distance between an object and the working end of the fiber.

FIG. 2 shows two curves $C_1$ and $C_2$ indicating the change in the apparent resolving power P of a fiber as a function of the distance $d$ at which object is placed from the working end of the fiber in question.

Curve $C_1$ shows this change for conventional fibers. Point A on the ordinate axis represents the inherent resolving power of the fiber (for $d = o$) which is a constant. It can be seen that apparent resolving power falls off rapidly with increasing distance $d$.

Curve $C_2$ shows the change in apparent resolving power with distance in the case of a fiber according to the invention whose outer surface is extended by a shield having a length $d_1$. Point C shows the resulting value of the resolving power for this distance; it is greater than that shown by point B at this same distance for a conventional type of fiber.

Figure 3:
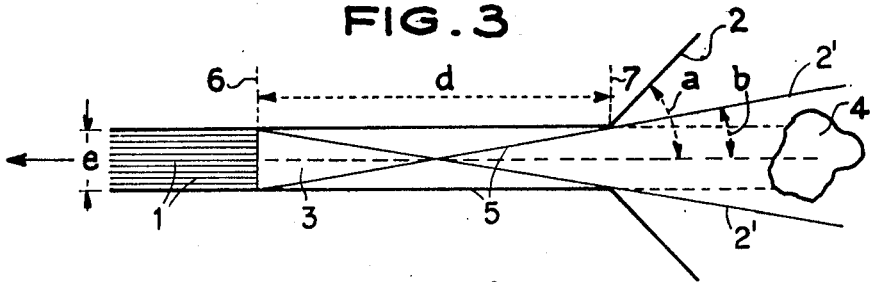
FIG. 3 is a diagrammatic view of a fiber-optical structure in accordance with my invention.

In FIG. 3 and subsequent Figures I have shown bundles of fibers 1 of the type described in connection with FIG. 1. Thus when reference is made hereinafter to a fiber, this also applies to such a fiber bundle.

The fiber bundle 1 of FIG. 3 has a working face 6, proximal to an object 4, beyond which there extends a shield 5 of light-absorbing material forming a light-guiding channel 3 of length $d$ terminating at a transverse plane 7, the channel having a width $e$. Also indicated in this Figure are the limiting rays 2 of FIG. 1, defining with the central axis of the structure the inherent aperture angle $a$, as well as an apparent aperture angle $b$ included with that axis by limiting rays 2' which extend diagonally through the longitudinal axial section of channel 3. It will be readily apparent that angle $b$ is considerably smaller than angle $a$ and that its tangent is the ratio of the width $e$ to the length $d$. Any rays including an angle greater than $b$ with the axis will be absorbed by the channel walls.

The resulting increase in apparent power of resolution is, however, accompanied by a loss of luminous energy transmitted between the fibers and the object 4. While the length $d$ should always be substantially greater than the width $e$, as shown, the optimum ratio depends on various factors such as the size of the fiber bundle and, in the reading of a document, the amount of detail involved. In a practical embodiment carried out in accordance with the principles of the invention, the adopted ratio $d:e$ was on the order of 6.1:1. Thus, if $e$ is on the order on 0.4mm, the depth $d$ is of the order of 2.5mm.

Figure 4:
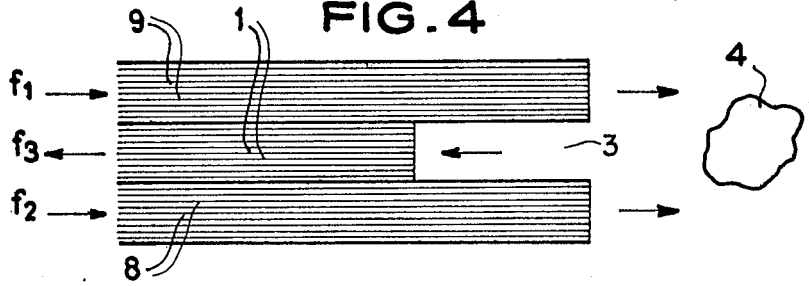
FIGS. 4 to 8 are diagrammatic views of particular embodiments of the invention.

FIG. 4 is a schematic view of an embodiment in which the fiber 1 is set back between two other fibers 8 and 9 flanking the channel 3. The flanking fibers 8 and 9 are assumed to originate at a light source (not shown) supplying these fibers with illuminating flux $f_1$, $f_2$ for object 4, whereas the recessed fiber 1 conducts light reflected by the object 4 as a flux $f_3$ to a reading device which is (also not shown) in the Figure.

Figure 5:
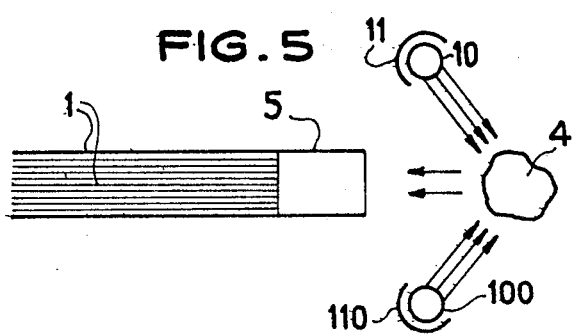

FIG. 5 shows another embodiment of my invention in which the receiving fiber 1 is positioned between light absorbing channel walls 5 as in FIG. 3, the object 4 being directly illuminated in this case by external sources 10, 100. The channel walls are, of course, again made of a light-absorbent material and the sources 10, 100 are shielded by reflectors 11, 110 to prevent their light from falling directly on the receiving fiber.

Figure 6:
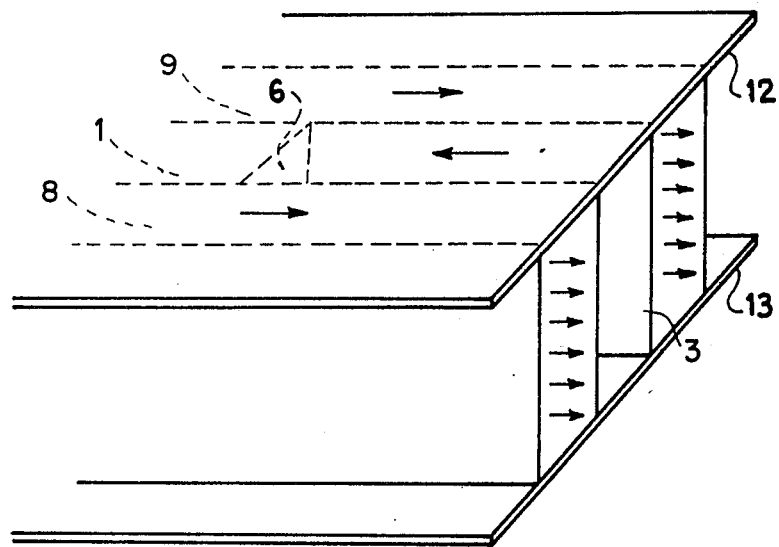

FIG. 6 is a view similar to that of FIG. 4, the fibers 1, 8, 9, being here of rectangular cross-section. The assembly is confined between two light-absorbent plates 12 and 12'. The light-transmitting fibers 8 and 9, terminating at the transverse plate edges proximal to the nonillustrated object, form the lateral boundaries of channel 3 and must therefore be light-absorbent along the channel walls.

Figure 7:
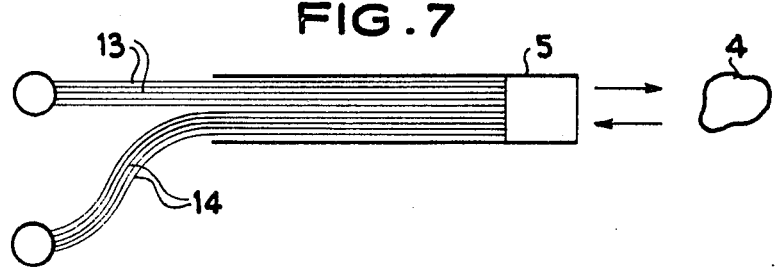

FIG. 7 shows an embodiment similar to that in FIG. 3 but with all the fibers, set back from the transverse plane 7 at the end of the light-guiding channel formed by the shield 5. In this bundle, certain fibers 13 have the task of transmitting light while other fibers 14 have the task of receiving light.

Figure 8:
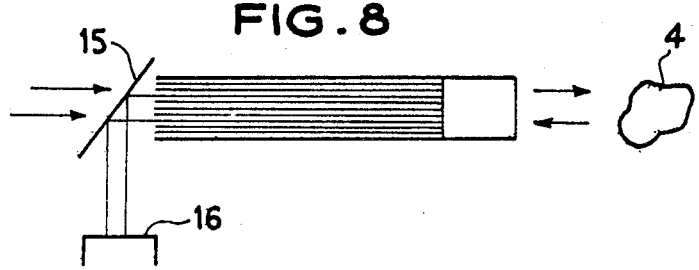

FIG. 8 shows yet another embodiment in which the transmitting and receiving fibers are intermingled in the bundle. A semi-transparent mirror 15 is used to separate received light from transmitted light. A light-receiving device is shown at 16.

What is claimed is:

1. A fiber-optical structure comprising:
   a pair of light-transmitting fiber bundles originating at a source of illuminating flux;
   a light-receiving fiber bundle bracketed by said light-transmitting fiber bundles for picking up reflected flux from an object illuminated by said light-transmitting fiber bundles, said light-receiving fiber bundle terminating at a receiver for the reflected flux, all said fiber bundles being of rectangular cross-section with coextensive contacting sides, said light-transmitting fiber bundles having ends remote from said source extending beyond an end of said light-receiving fiber bundle remote from said receiver for forming two opposite light-absorbing boundaries of a light-guiding channel traversed by the reflected flux, said remote end of said light-receiving fiber bundle being directly exposed to incident light; and
   a pair of parallel shield plates with light-absorbing surfaces overlying opposite sides of said fiber bundles transverse to said contacting sides and extending to said remote ends of said light-transmitting fiber bundles, thereby forming two other boundaries of said light-guiding channel.

2. A structure as defined in claim 1 wherein said light-guiding channel has a length substantially exceeding its width.

3. A structure as defined in claim 2 wherein the ratio of said length to said width is on the order of 6:1.

* * * * *